United States Patent [19]

Williams

[11] 4,104,644

[45] Aug. 1, 1978

[54] FRAMING PULSE GENERATOR FOR FACSIMILE RECORDER

[75] Inventor: George C. Williams, South Easton, Mass.

[73] Assignee: Alden Research Foundation, Westboro, Mass.

[21] Appl. No.: 755,342

[22] Filed: Dec. 29, 1976

[51] Int. Cl.² ............................................. G01D 15/06
[52] U.S. Cl. ................................................ 346/139 A
[58] Field of Search ............................ 346/139 A, 165

[56] References Cited

U.S. PATENT DOCUMENTS

| 2,883,642 | 4/1959 | Kietz | 346/139 A |
| 3,369,250 | 2/1968 | Gifft | 346/139 A |

*Primary Examiner*—Joseph W. Hartary
*Attorney, Agent, or Firm*—James H. Grover

[57] ABSTRACT

A facsimile recorder using an endless scanning belt which carries styli for electrically marking graphic signals on a recording web has a pulley for the belt at the finish of a scan across the web. The belt includes conductive means connected to or integral with the stylus which contacts the pulley as the stylus passes over the pulley. During the pass the stylus touches a contact adjacent the pulley thereby completing a framing pulse generating circuit through the pulley and contact. This recorder framing pulse is compared with a synchronization (sync) pulse of an incoming facsimile signal and used to synchronize the scanning belt with the signal.

4 Claims, 10 Drawing Figures

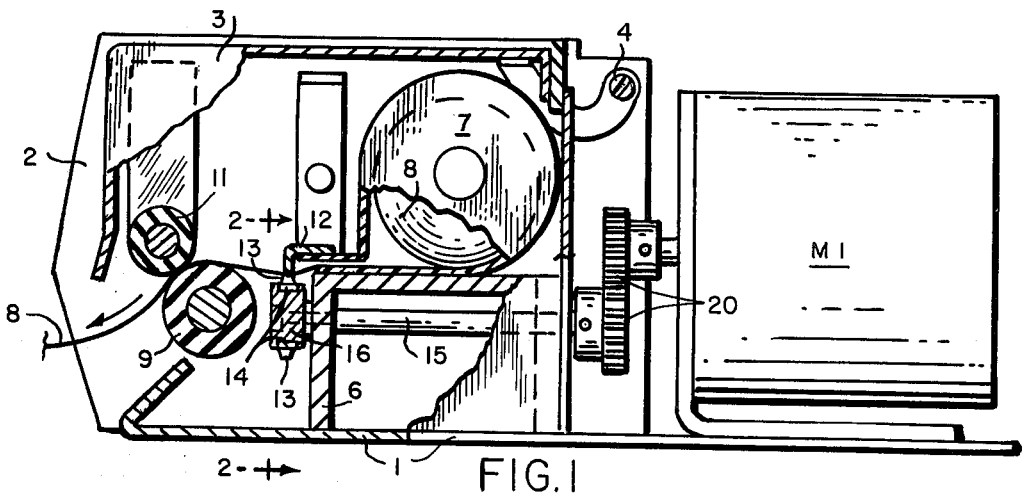
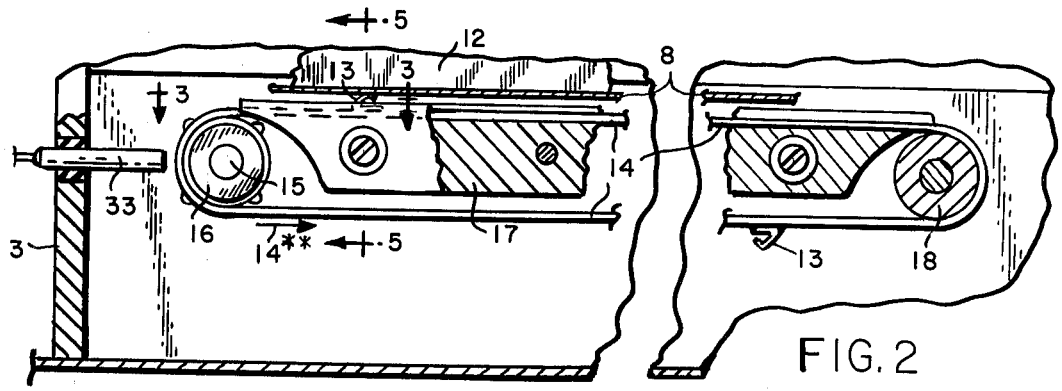
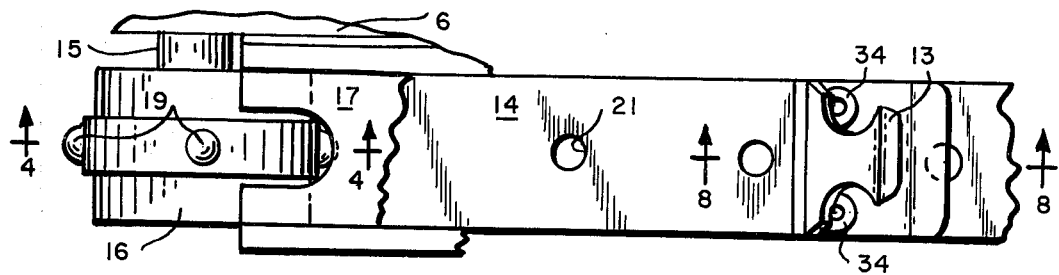
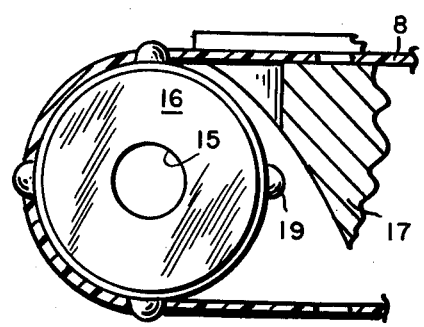
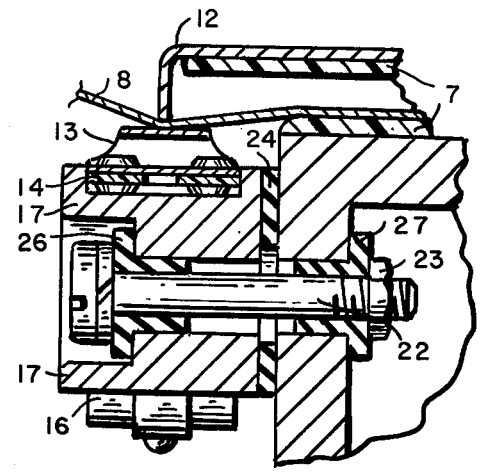

FRAMING PULSE GENERATOR FOR FACSIMILE RECORDER

RELATED APPLICATION

Reference is made to my application entitled Electrical Recorder and Belt with Styli Therefor, Ser. No. 755,211, filed Dec. 29, 1976, now U.S. Pat. No. 4,060,815 and incorporated by reference herein.

BACKGROUND OF THE INVENTION

In facsimile recording it is necessary that the recorder scanning and marking mechanism which applies the facsimile signals to a moving strip of recording paper be synchronized with the facsimile signals coming into the recorder. For this synchronization it is well known to provide a framing circuit controlling the phase of a motor driving the scanning and marking mechanism. Such a framing circuit receives the synchronization pulse portion of the incoming facsimile pulse and also a corresponding framing pulse whose timing is dependent on the angular position of the scanning motor, and by comparing the time of occurrence of the framing and sync pulses adjusts the phase of the motor to bring the two pulses into coincidence or a similar relation.

One form of scanning electrode is a conductive signal marking stylus carried on a belt which conveys the stylus on two or more styli across the web along the recording zone. Examples of such belt-supported styli are found in U.S. Pat. Nos. 2,879,129 to M. Alden, 3,363,261 to K. Maiershofer and 3,369,250 to T. H. Gifft.

With such belt-supported styli a frame of graphic information is recorded by applying signals line by line to the stylus. It is necessary that each traverse of a stylus across the recording web precisely coincides with the line of signal information applied the stylus during the traverse. That is, each line of the frame of graphic information must start at the same instant the stylus starts its scan across a line of the web. If the traverse starting position of the stylus were to change from line to line in a frame some lines would be offset from others thereby distorting the graphic information in the frame or rendering it illegible.

It is an object of the present invention to provide an improved way of generating a framing pulse in a facsimile recorder using belt driven styli.

STATEMENT OF INVENTION

According to the invention facsimile recording apparatus for electrically marking graphic signals on a recording web comprises an assembly defining an elongate scanning zone through which the web is fed, a belt carrying at least one conductive stylus and conveying the stylus along the zone across the web to mark signals on the web, a pulley at one end of the scanning zone interengaging with the belt, the belt including conductive means electrically connected to the stylus and making electrical contact with the pulley, and contact means adjacent the pulley in the path of the stylus so that the stylus completes a pulse generating circuit through the pulley and contact.

DRAWINGS

FIG. 1 is a side elevation, partly broken away, of a belted stylus facsimile recorder;

FIG. 2 is a section on line 2—2 of FIG. 1 showing the stylus belt in elevation;

FIG. 3 is a section on line 3—3 of FIG. 2;

FIG. 4 is a section on line 4—4 of FIG. 3;

FIG. 5 is a section on line 5—5 of FIG. 2;

DESCRIPTION

Figure 6:
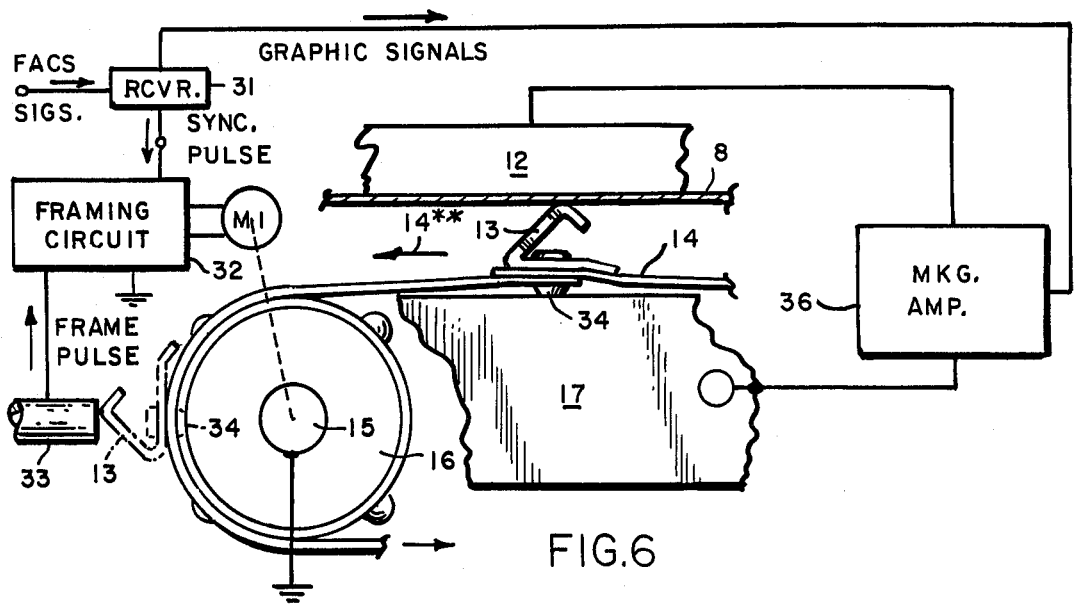
FIG. 6 is a schematic diagram showing electrical circuits in the recorder.
Figure 7:
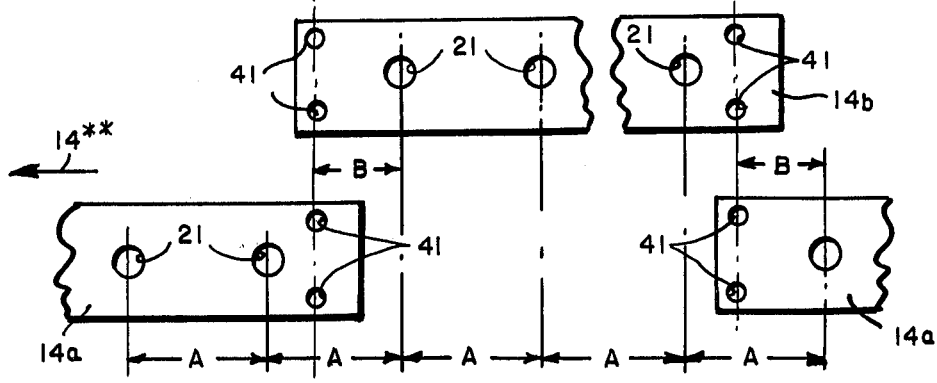
FIG. 7 is a plan view showing the geometric relation of plural belt sections.

The facsimile recorder shown in FIG. 1 comprises a base 1 with sidewalls 2, of which one is shown, and a cover 3 hinged at 4 to the sidewalls. Within the cover is a bracket 6 which supports a cassette 7 of electrolytic recording paper 8. The paper is drawn from a roll within the cassette by a feed roll 9 and idler roll 11, passing under an elongate, linear marking electrode or blade 12, carried on the cassette as fully described in U.S. Pat. No. 3,875,577 to John M. Alden, which is incorporated herein by reference. As the paper is drawn relatively slowly under the linear electrode 12 it is scanned, line by line, transversely of the direction of paper feed, by styli 13 carried on a belt 14 of insulative material. The assembly, including the bracket 6 which mounts the cassette with its blade 12 and the scanning belt 14 with styli 13, defines an elongate scanning zone between the blade and the path of the styli.

Figure 9:
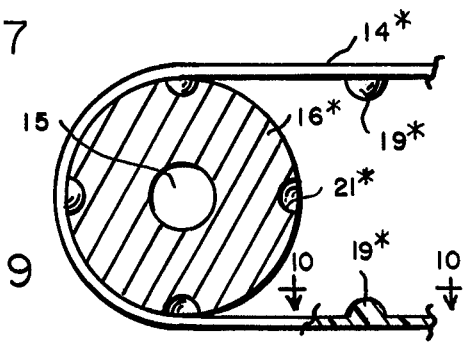
FIG. 9 is a view like FIG. 4 showing an alternative form of belt and feed pulley therefor.
Figure 8:
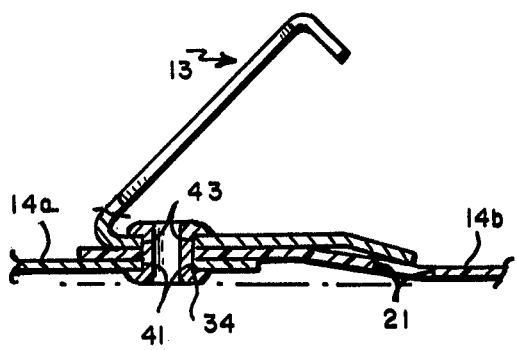
FIG. 8 is an enlarged section on line 8—8 of FIG. 3.
Figure 10:
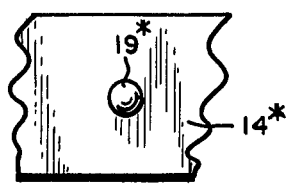
FIG. 10 is a view from line 10—10 of FIG. 9.

As shown in FIG. 2 the belt is orbited in the direction of the arrow 14** on a path along the top and bottom of a guide rail 17 around a drive pulley 16 and an idler pulley 18. The drive pulley 16 is turned on a shaft 15 coupled through gears 20 to a motor M1. As shown in FIGS. 3 and 4 the drive pulley 16 is provided with teeth 19 engaging in feed perforations 21 in the belt, although the feed elements can be reversed, as shown in FIGS. 9 and 10, by providing feed teeth 19* on a modified belt 14* and tooth engaging recesses 21* on a modified drive roll 16*. The guide rail 17 is mounted on the bracket 6 by a bolt 22 and unit 23, but is electrically insulated from the bracket by insulative washers 24, 26 and 27, as shown in FIG. 5.

Electronic circuits are shown diagramatically in FIG. 6 which control the synchronization of the scanning belt 14 with incoming facsimile signals (FACS. SIGS.) and which apply the graphic portion of the signals through the styli 13 to the electrolytic paper 8. The incoming facsimile signals transmitted to a receiver (RCVR) 31 consists of a synchronization (SYNC) pulse preceding the many lines of graphic signals making up one frame of graphic information. The sync pulse signals the start of the first line of the frame and it is essential for intelligible recording that the recorder scan, that is one stylus 13, begin its first line traverse of the recording paper at the same time as the sync pulse. For this purpose the sync pulse is separated from the graphic information and applied to a framing circuit 32 which controls the speed of the belt drive motor M1 and its phase relative to the sync pulse. The framing circuit 32 also receives a frame pulse generated by the belt styli 13. Whenever a stylus 13 reaches the phantom position of FIG. 6 on the drive roll 16 at the end of a line scan (in which case there would be no stylus at the solid line position) the stylus makes contact with a button or like terminal 33. The drive roll 16 is grounded and the stylus is electrically connected to the drive roll by conductive eyelets 34 described more fully hereinafter. Thus in the phantom position the stylus contact with the button 33 momentarily completes a sub-circuit in the framing circuit and applies a pulse thereto. As is known in the art, the framing circuit compares the relative timing of the sync pulse and framing pulse and adjusts the phase of the belt drive motor M1 until the two pulses are in phase. Preferably several sync pulses and framing pulses are compared prior to transmission of the graphic signals. The graphic signals are then modified and amplified in a marking amplifier 36 and applied line by line through the electrolytic recording paper 8 in a circuit including the linear electrode 12, the paper 8, the stylus 13, eyelets 34 and guide rail 17 to which the marking amplifier is connected. During graphic recording correct phasing of the belt and the incoming facsimile signals may be maintained by a crystal controlled oscillator in the framing circuit 32 which holds the belt drive motor at a standard speed.

It should be understood that the present disclosure is for the purpose of illustration only and that this invention includes all modifications and equivalents which fall within the scope of the appended claims. For example, the belt may be conductive rather than insulative, or the stylus may extend to pulley 16.

I claim:

1. Facsimile recording apparatus for electrically marking graphic signals line by line on a recording web, each line of graphic signals being preceded by a syncronization pulse, said apparatus comprising:
   an assembly defining an elongate scanning zone through which the web is fed;
   a belt carrying at least one conductive stylus and conveying the stylus along the zone across the web to mark signals on the web;
   a conductive pulley at one end of the scanning zone interengaging with the belt, the belt including conductive means electrically connected to the stylus and making electrical contact with the pulley;
   means for driving the belt;
   contact means adjacent the pulley beyond the scanning zone in the path of the stylus so that the stylus completes a pulse generating circuit through the pulley and contact means for each scan of the zone before the stylus is conveyed into the recording zone; and
   a framing circuit connected to the contact means for receiving the generated pulse and controlling the belt driving means thereby to frame the graphic signals on the recording web.

2. Apparatus according to claim 1 wherein the belt is insulative and the stylus extends through the belt.

3. Apparatus according to claim 1 wherein the belt is insulative and conductive means extend from the stylus to the pulley side of the belt.

4. Apparatus according to claim 1 including teeth disposed in conjunction with said pulley and said belt to positively drive said belt and avoid slippage around said pulley.

* * * * *